United States Patent
Kim et al.

(10) Patent No.: US 9,723,103 B2
(45) Date of Patent: Aug. 1, 2017

(54) COMMUNICATION METHOD OF ADMINISTRATION NODE, REQUESTING NODE, AND NORMAL NODE FOR DELETING INVALID CONTENT USING CONTENT REVOCATION LIST IN CONTENT CENTRIC NETWORK

(71) Applicant: Samsung Electronics Co. Ltd., Suwon-si (KR)

(72) Inventors: Eun Ah Kim, Seoul (KR); Seog Chung Seo, Seoul (KR); Seong Ik Hong, Suwon-si (KR); Byoung Joon Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

(21) Appl. No.: 14/189,538

(22) Filed: Feb. 25, 2014

(65) Prior Publication Data

US 2014/0258490 A1   Sep. 11, 2014

(30) Foreign Application Priority Data

Mar. 11, 2013 (KR) .................. 10-2013-0025696

(51) Int. Cl.
  *H04L 29/08* (2006.01)
  *H04L 29/06* (2006.01)
  *H04L 12/721* (2013.01)

(52) U.S. Cl.
  CPC .......... *H04L 67/32* (2013.01); *H04L 63/0823* (2013.01); *H04L 63/0876* (2013.01); *H04L 67/327* (2013.01); *H04L 45/32* (2013.01)

(58) Field of Classification Search
  CPC ...... H04L 28/42; H04L 45/306; H04L 9/3268; H04L 45/7453; H04L 2209/60;
  (Continued)

(56) References Cited

U.S. PATENT DOCUMENTS 7,350,041 B1 * 3/2008 Armangau ............ G06F 3/0605
                                                    711/108
7,644,270 B1 * 1/2010 Cherukumudi ...... H04L 63/0823
                                                    709/206

(Continued)

FOREIGN PATENT DOCUMENTS

KR     2003-0014513 A   2/2003
KR   10-2009-0025940 A  3/2009

OTHER PUBLICATIONS

Extended European Search Report issued by the European Patent Office on May 16, 2014 for the corresponding EP Patent Application No. 14158840.0 (6 pages).

*Primary Examiner* — Chirag R Patel
(74) *Attorney, Agent, or Firm* — NSIP Law

(57) ABSTRACT

Provided is a communication method for an administration node in a content centric network (CCN). The communication method includes receiving a packet requesting deletion of an invalid content from a requesting node that detects the invalid content, generating a content revocation list including a name of the invalid content and a period of time over which the deletion is to be performed, and flooding a data packet including the content revocation list to the requesting node and a normal node included in the CCN. Also provided are related communications methods for a receiving node and a normal node, as well as the nodes themselves.

26 Claims, 12 Drawing Sheets

(58) Field of Classification Search
CPC .............. H04L 63/0823; H04L 9/0891; H04N 21/2585; G06F 17/30079; G06F 17/30117; G06F 17/30067
See application file for complete search history.

(56) References Cited

U.S. PATENT DOCUMENTS

| | | |
|---|---|---|
| 2002/0062336 A1 | 5/2002 | Teodosiu et al. |
| 2003/0182555 A1* | 9/2003 | Labaton .............. H04L 63/0442 713/176 |
| 2004/0054779 A1* | 3/2004 | Takeshima ........ G06F 17/30569 709/225 |
| 2004/0117440 A1* | 6/2004 | Singer ..................... G06F 21/10 709/203 |
| 2008/0134340 A1* | 6/2008 | Ueda ...................... G11B 27/10 726/26 |
| 2009/0288163 A1 | 11/2009 | Jacobson et al. |
| 2011/0271007 A1 | 11/2011 | Wang et al. |
| 2011/0289533 A1 | 11/2011 | White et al. |
| 2012/0304313 A1* | 11/2012 | Mao ...................... H04L 67/104 726/29 |
| 2012/0314580 A1 | 12/2012 | Hong et al. |
| 2013/0163610 A1* | 6/2013 | Ko ........................ H04L 67/327 370/428 |

\* cited by examiner

COMMUNICATION METHOD OF ADMINISTRATION NODE, REQUESTING NODE, AND NORMAL NODE FOR DELETING INVALID CONTENT USING CONTENT REVOCATION LIST IN CONTENT CENTRIC NETWORK

CROSS-REFERENCE TO RELATED APPLICATIONS

This application claims the benefit under 35 U.S.C. §119 (a) of Korean Patent Application No. 10-2013-0025696 filed on Mar. 11, 2013, in the Korean Intellectual Property Office, the entire disclosure of which is incorporated herein by reference for all purposes.

BACKGROUND

1. Field

The following description relates to a communication method of an administration node, a requesting node, and a normal node for deleting invalid content using a content revocation list in a content centric network (CCN), and to the nodes themselves.

2. Description of Related Art

In a content centric network (CCN), packets are classified into content request packets and content reply packets. A content request packet, also referred to as an interest, includes a name of a requested content. A content reply packet includes the requested content and a name of the requested content.

When a network device receives a content request packet, the network device may look up content included in a storage of the network device by a content name included in a header of the content request packet. When corresponding content is present in the storage, the network device may deliver the corresponding content to a requester. Unlike an Internet protocol (IP)-based Internet, in which content may be obtained from an original owner of the content, a CCN may enable an intermediate node, in which a corresponding content is cached in a storage space, to transmit the cached corresponding content as a reply. Accordingly, an average length of a transmission route may be reduced. As a result, overall usage of a network may be reduced, in that shorter transmission routes do not require as much network load into to successfully transmit content when it is requested.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a communication method performed by an administration node in a content centric network (CCN) includes receiving a packet requesting deletion of an invalid content from a requesting node that detects the invalid content, generating, in response to the packet requesting deletion of the invalid content being received, a content revocation list including a name of the invalid content and a period of time over which the deletion is to be performed, and transmitting a data packet including the content revocation list to the requesting node and a normal node in the CCN.

The method may further include authenticating the requesting node by using a digital signature in the packet requesting deletion of the invalid content.

The generating of the content revocation list may further include generating the content revocation list in response to the authentication of the requesting node using the digital signature being successful.

The packet requesting deletion of the invalid content may include at least one of a name of the invalid content, an identification (ID) for identifying a control operation to be performed on the invalid content, additional information associated with the control operation, and a digital signature of the requesting node.

The data packet may further include at least one of a name of the content revocation list, an identification (ID) for identifying a control operation to be performed on the invalid content, additional information associated with the control operation, and a digital signature of the administration node.

The administration node may be authorized to generate a name of the content revocation list and to create a digital signature in the data packet including the content revocation list, and contains a security key.

The invalid content may include at least one of a content for which a service is discontinued by a publisher, a content required for modification or update, and a malicious content.

In another general aspect, a communication method performed by a requesting node in a content centric network (CCN) includes generating a packet requesting deletion of an invalid content in response to the invalid content being detected, transmitting the packet requesting deletion of the invalid content to an administration node, receiving a data packet including a content revocation list from the administration node, in response to the transmission, and deleting the invalid content based on the content revocation list, wherein the content revocation list includes a name of the invalid content and a period of time over which the deletion is to be performed.

The data packet may further include at least one of a name of the content revocation list, an identification (ID) for identifying a control operation to be performed on the invalid content, additional information associated with the control operation, and a digital signature of the administration node, and the method may further include certifying that the data packet is generated by the administration node by using the digital signature in the data packet.

The method may further include transmitting a packet requesting the content revocation list to the administration node, and receiving a data packet including the content revocation list, in response to the request.

In another general aspect, a communication method performed by a normal node in a content centric network (CCN) includes receiving a data packet including a content revocation list, and deleting a content corresponding to a name in the content revocation list from contents stored in a content store, wherein the content revocation list includes a name of an invalid content and a period of time over which the deletion is to be performed.

The method may further include maintaining the content revocation list during the period of time over which the deletion is to be performed.

The data packet may further include at least one of a name of the content revocation list, an identification (ID) for identifying a control operation to be performed on the invalid content, additional information associated with the control operation, and a digital signature of an administration node, and the receiving of the data packet may include receiving the data packet including the content revocation list irrespective of whether an entry for the data packet is present in a pending interest table (PIT) in response to the ID for identifying the control operation indicating that a content deletion operation is to be performed on the invalid content.

The method may further include in response to a case in which after the content is deleted, a content corresponding to a name of the deleted content being received, deleting the received content without caching when the content having the name of the deleted content is received within the period of time over which the deletion is to be performed.

The method may further include receiving a packet requesting deletion of the invalid content from a requesting node.

The packet requesting deletion of the invalid content may include at least one of a name of the invalid content, an ID for identifying a control operation to be performed on the invalid content, additional information associated with the control operation, and a digital signature of the requesting node.

The method may further include recording a face for flooding the data packet including the content revocation list in a pending interest table (PIT) when the ID for identifying the control operation in the packet requesting deletion of the invalid content indicates a content deletion operation to be performed on the invalid content.

The recording of the face for flooding the data packet may include recording, in the PIT, at least one of all faces including a face through which the packet requesting deletion of the invalid content is received, at least one of faces connected to the normal node, and a remaining face other than a particular face to which the data packet is forwarded.

The method may further include transmitting a packet requesting the content revocation list to an administration node, and receiving a data packet including the content revocation list, in response to the request.

In another general aspect, a non-transitory computer-readable storage medium storing a program for a communication method performed by an administration node in a content centric network (CCN), the program including instructions for causing a computer to perform the first method presented above.

In another general aspect, an administration node in a content centric network (CCN) includes a receiving unit configured to receive a packet requesting deletion of an invalid content from a requesting node that detects the invalid content, a generating unit configured to generate, in response to the packet requesting deletion of the invalid content being received, a content revocation list including a name of the invalid content and a period of time over which the deletion is to be performed, and a flooding unit configured to transmit a data packet including the content revocation list to the requesting node and a normal node in the CCN.

The administration node may further include a control unit configured to authenticate the requesting node by using a digital signature in the packet requesting deletion of the invalid content.

The generation unit may be further configured to generate the content revocation list in response to the authentication of the requesting node using the digital signature being successful.

In another general aspect, a requesting node in a content centric network (CCN) includes a generation unit configured to generate a packet requesting deletion of an invalid content in response to the invalid content being detected, a transmitting unit configured to transmit the packet requesting deletion of the invalid content to an administration node, a receiving unit configured to receive a data packet including a content revocation list from the administration node, in response to the transmission, and a deletion unit configured to delete the invalid content based on the content revocation list, wherein the content revocation list includes a name of the invalid content and a period of time over which the deletion is to be performed.

The requesting node may further include a transmission unit configured to transmit a packet requesting the content revocation list to the administration node, and a receiving unit configured to receive a data packet including the content revocation list, in response to the request.

Other features and aspects will be apparent from the following detailed description, the drawings, and the claims.

Figure 1:
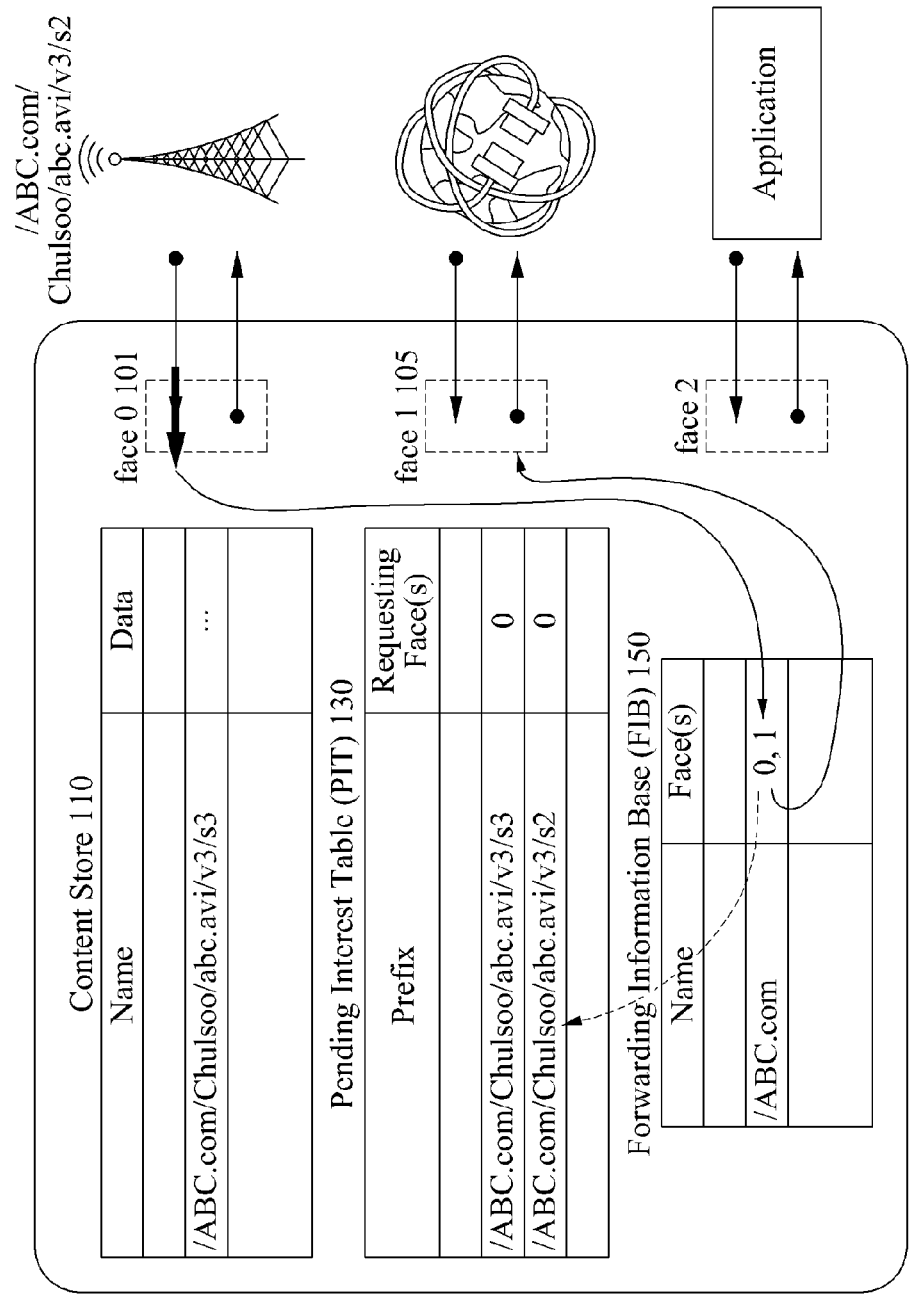
FIG. 1 illustrates a method of processing a content request packet in a node included in a content centric network (CCN) according to a related art.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, the term "node" as used herein includes user terminals. Such user terminals that are referred to as "nodes" include a wide range of electronic devices that are capable of communication in a content centric network (CCN). For example, such electronic devices include smart phones, smart TVs, personal computers (PCs), lap-top computers, customer devices, for example, robot cleaners, and devices in a CCN, for example, access points. However, it is easily recognized that the electronic devices listed above are only a few examples of the wide variety of devices that are able to participate in a CCN, and any electronic device, whether mobile or no, that is capable of communicating with other devices in a CCN, such as to share data, is potentially suitable for inclusion in an embodiment.

FIG. 1 illustrates a method of processing a content request packet in a node included in a CCN according to a related art.

The CCN, according to an embodiment, allows requesting and providing for all entities included in the CCN. Types of entities include services and devices, as well as content.

In the CCN, a name of content functions as a compass to find a node in which the corresponding content is stored, in that it helps locate the content, and functions to distinguish the corresponding content from other content. That is, in the CCN the name of content provides directions that indicate how to traverse the network to locate the content. For example, the name may include path information that identifies a hierarchy of machines and folders in the CCN that identify where the content is located. Additionally, only one content corresponds to a given name. Accordingly, each content uses its unique name, and two contents having differing names may be regarded as different contents even when the contents include the same information.

For example, when two files include the same content, but include different names, for example, "/ABC.com/sait/video/intro.avi" and "/ABC.com/sait/comm/video/intro.avi", the two files are treated as different contents. This rule is useful in distinguishing different contents with similar names, in that unless two contents have identical names, they are considered to be different contents.

Referring to FIG. 1, a method of fetching content based on a hierarchical name of the content, which is also a method of processing a content request packet in a CCN, also known as a named data network, is illustrated.

For example, a node included in the CCN receives, via a face 0 101 from, for example, another node, a content request packet requesting content corresponding to a hierarchical name of the content, such as, "/ABC.com/Chulsoo/abc.avi/v3/s2".

In this example, a networking module of the node determines whether the corresponding content is stored in a content store 110 of the node by referring to the hierarchical name of the content, "/ABC.com/Chulsoo/abc.avi/v3/s2", included in the content request packet discussed as having been received, above.

In response to the corresponding content being determined to be present in the content store 110, the node returns the corresponding content via the face 0 101 through which the content request packet is received.

Throughout this application, the term "face" is used interchangeably with the term "interface", such that where a "face" is referred to it is intended to mean "interface," and vice versa. For example, a "face" or "interface" may refer to an intermediary between two communicating entities through which information is exchanged. However, "face" and "interface" are used throughout this application in a manner that is appropriate to their context.

In contrast, in response to the corresponding content being determined to be absent in the content store 110, as shown in FIG. 1, the node determines whether an entry stored with the same hierarchical name of the content "/ABC.com/Chulsoo/abc.avi/v3/s2" is included in a Pending Interest Table (PIT) 130 of the node. A PIT manages requests for content that have been received, but have not been responded to yet.

When the entry stored with the same hierarchical name of the content is determined to be included in the PIT 130, as shown in FIG. 1, the node adds information on the face 0 101 to the corresponding entry in the PIT 130. More particularly, the corresponding entry in the PIT 130 is changed to indicate that the face 0 101 is a requesting face.

However, when the entry registered with the same hierarchical name of the content is determined to be absent in the PIT 130, the node further searches for the corresponding entry by performing a lookup in a Forwarding Information Base (FIB) 150 based on the hierarchical name of the content. Various techniques are available to perform the lookup in the FIB 150 to perform a further search. In this example, the node conducts a search of the FIB 150 using longest prefix matching.

Subsequently, the node selects or determines a face to be used to forward the content request packet. In the example of FIG. 1, the selected face for this purpose is a face 1 105. The selection or determination is based on information registered in the FIB 150. After the selection is made, the node transmits the content request packet to the corresponding face 1 105.

In this example, the node registers, in the PIT 130, information '0' regarding the face 0 101 initially used to receive the content request packet. The registration is performed to facilitate delivery of a data packet that includes the corresponding content to a node that requests the corresponding content when a relevant content request packet is received in the future. Additionally, in an embodiment one of faces other than the requesting face 0 101 is selected or determined based on the FIB 150, to be a face enabling the content request packet to be forwarded.

Figure 2:
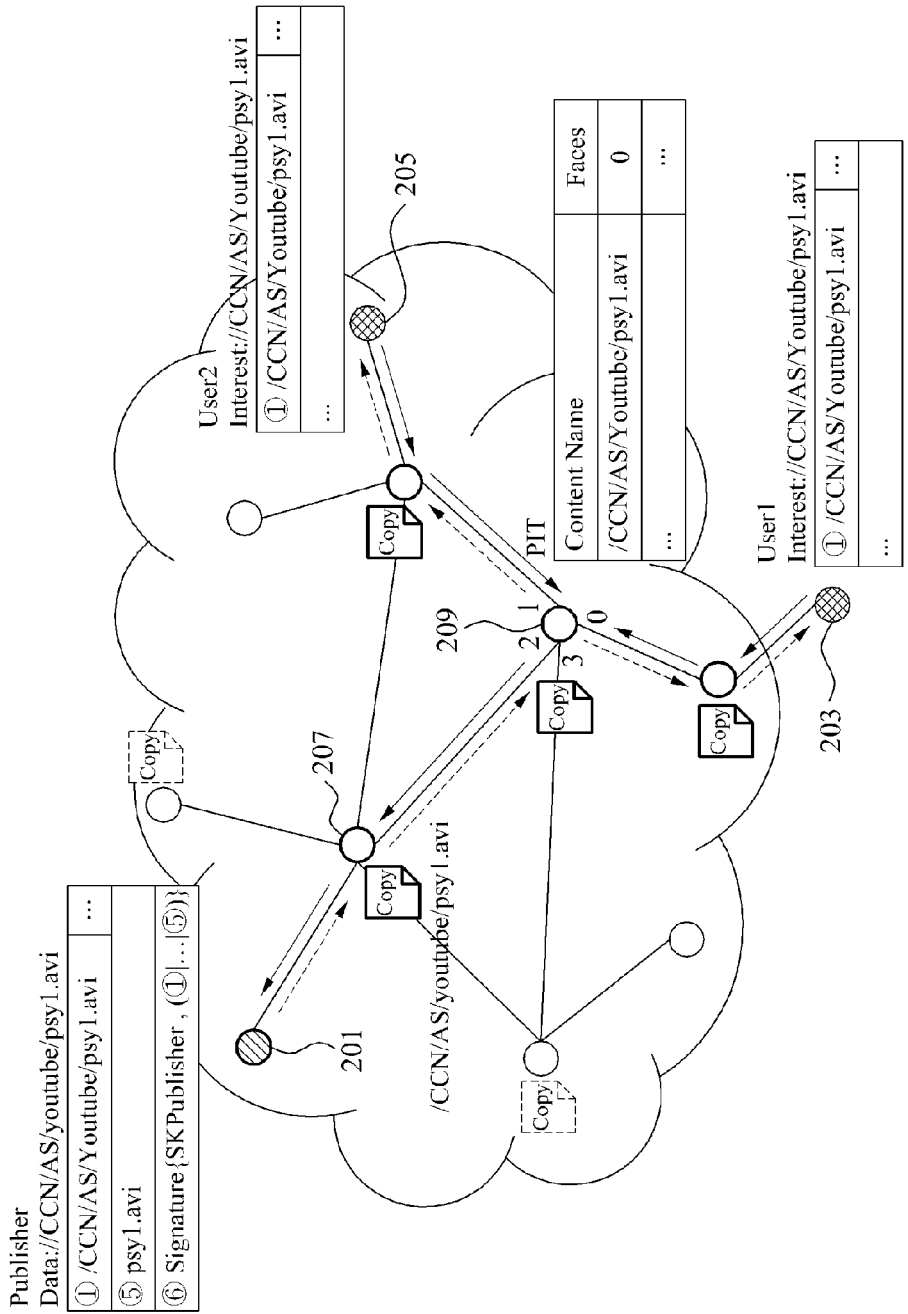
FIG. 2 illustrates a method of transmitting a content request packet and transmitting a data packet in response to the content request packet in a CCN according to a related art.

FIG. 2 illustrates a method of transmitting a content request packet and transmitting a data packet in response to the content request packet in a CCN according to a related art.

Referring to FIG. 2, nodes 203 and 205 each transmit a content request packet. In this example, the content requested is identified as "Interest: //CCN/AS/Youtube/psy1.avi". Such a request is issued within the CCN to request content corresponding to a name, for example, "/CCN/AS/Youtube/psy1.avi".

When nodes receive the content request packet, the nodes search for the content corresponding to the name of the content in content stores or caches of the nodes. Such a search is carried out determine if the nodes have direct local access to the data identified in the content request packet. When the corresponding content is present, nodes generate and transmit a data packet along a transmission path of the content request packet. Thus, nodes attempt to provide a requested data packet as quickly as possible, such that traversing the whole path to access a data packet is avoided if it is possible to provide the data packet more quickly.

In this example, among nodes receiving the content request packet, a node in which the corresponding content is stored provides a data packet including the content "/CCN/AS/Youtube/psy1.avi" to the nodes 203 and 205 requesting the data packet in response to the content request packet being received. For example, the node providing the content "/CCN/AS/Youtube/psy1.avi" is called a publisher 201. As used herein, the term "publisher" is used interchangeably with the term "owner" or "provider".

The data packet including the content "/CCN/AS/Youtube/psy1.avi" provided by the publisher 201 is forwarded to and cached in another node or nodes on the transmission path of the corresponding content. In this example, the data packet is forwarded to and cached in at least one of nodes 207 and 209.

In an embodiment, the data packet includes one or more of a name of a requested content, a content object, and a digital signature of a publisher.

Figure 3:
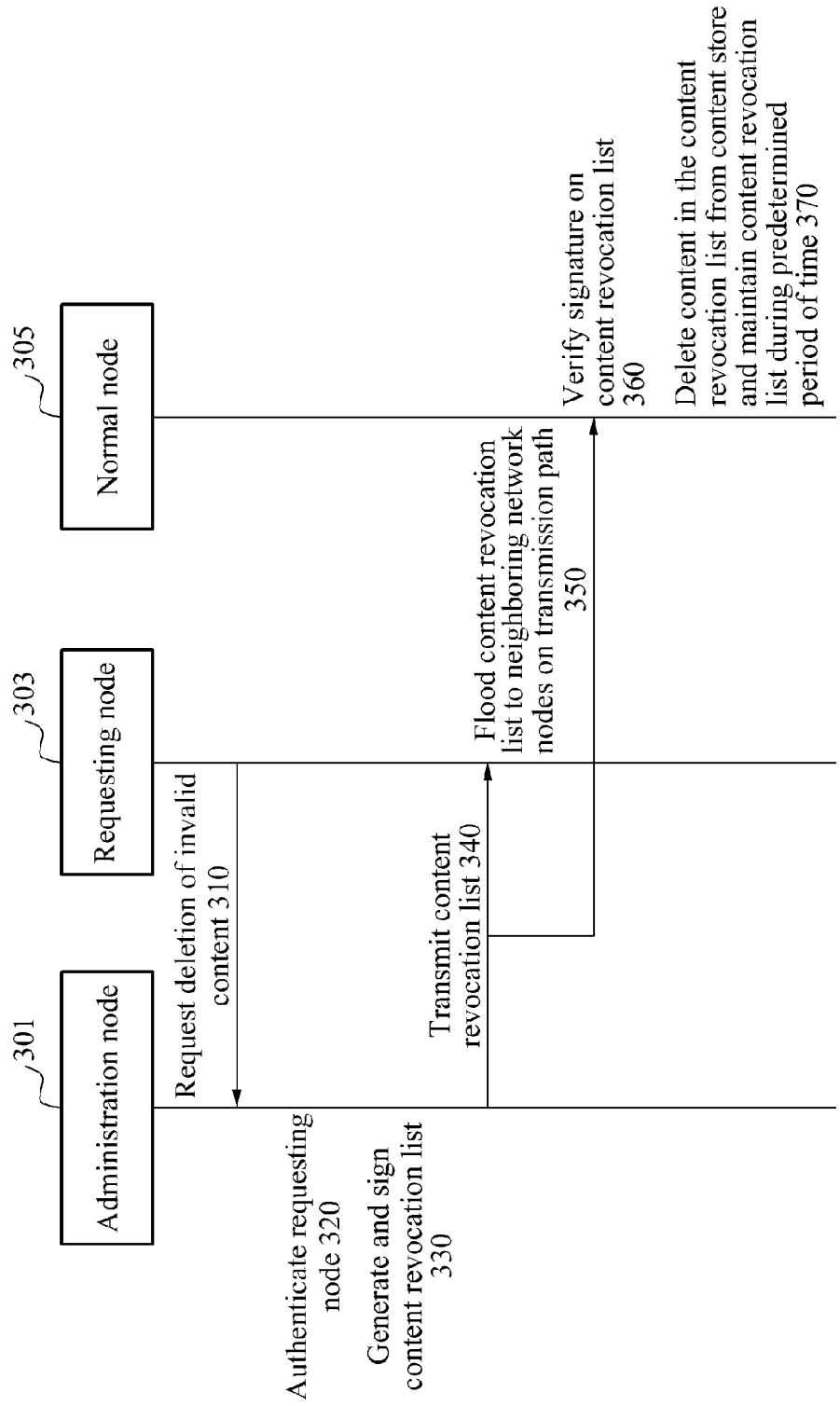
FIG. 3 illustrates a method of deleting invalid content using a content revocation list in an administration node, a requesting node, and a normal node included in a CCN according to an embodiment.

FIG. 3 illustrates a method of deleting invalid content using a content revocation list in an administration node, a requesting node, and a normal node included in a CCN according to an embodiment.

Referring to FIG. 3, the CCN according to an embodiment includes an administration node 301, a requesting node 303, and a normal node 305.

The administration node 301 refers to a node that is authorized to generate and transmit a content revocation list to enable deletion of contents cached in nodes. Aspects of which contents are to be deleted are discussed further, below.

The requesting node 303 refers to a node that transmits a packet requesting deletion of invalid content, namely, a deletion request packet to the administration node 301 when the invalid content is found.

The normal node 305 refers to remaining nodes other than the administration node 301 and the requesting node 303 in the CCN. Hence, all of the nodes in the CCN other than the administration node 301 and the requesting node 303 are normal nodes 305. FIG. 3 illustrates how the administration node 301, the requesting node 303, and the normal node 305 interact to delete invalid content.

In 310, the requesting node 303 requests deletion of invalid content to the administration node 301 when the invalid content is found.

In 320, when the administration node 301 receives a packet requesting deletion of the invalid content from the requesting node 303, the administration node 301 authenticates the requesting node 303 through a digital signature of the requesting node 303 included in the corresponding packet.

In 330, when the authentication of the requesting node 303 succeeds, the administration node 301 generates a data packet including a content revocation list, and also creates a digital signature in the generated data packet. For example, the content revocation list includes one or names of the invalid content requested to be deleted in 310.

The content revocation list corresponds to a CCN content including a list describing one or more names of content to be deleted and a period of time over which the deletion is to be performed.

In an example embodiment, the content revocation list includes version information, and when a new content revocation list is generated and propagated through the CCN, nodes in a CCN identify an updated content revocation list using the version information. The version information allows node in the CCN to determine which content revocation list is the most up-to-date. As examples, the version information is included in a content revocation list or an additional information field of a data packet including the content revocation list.

In 340, the administration node 301 transmits a data packet including the content revocation list to the requesting node 303 and the normal node 305.

When the administration node 301 transmits the data packet including the content revocation list to the requesting node 303, in an embodiment the administration node 301 transmits the data packet along a path through which the deletion request packet is received.

In 350, when the requesting node 303 and the normal node 305 receive the data packet that includes the content revocation list, the requesting node 303 and the normal node 305 flood the data packet including the content revocation list to neighboring network nodes on the transmission path. Flooding in this context refers to a routing process in which every incoming packet is sent through every outgoing link except the one it arrives on. The flooding may be controlled flooding to ensure that the flooding terminates.

In 360, after the normal node 305 receives the data packet including the content revocation list in 340 or 350, the normal node 305 verifies the signature in the content revocation list.

In 370, the normal node 305 deletes content corresponding to a name included in the content revocation list from a content store, and maintain the content revocation list during a predetermined period of time over which the deletion is to be performed, described in the content revocation list. By deleting the content corresponding to a name included in the content revocation list, an embodiment is able to make sure that cached information does not retain information that is obsolete and/or dangerous.

Figure 4:
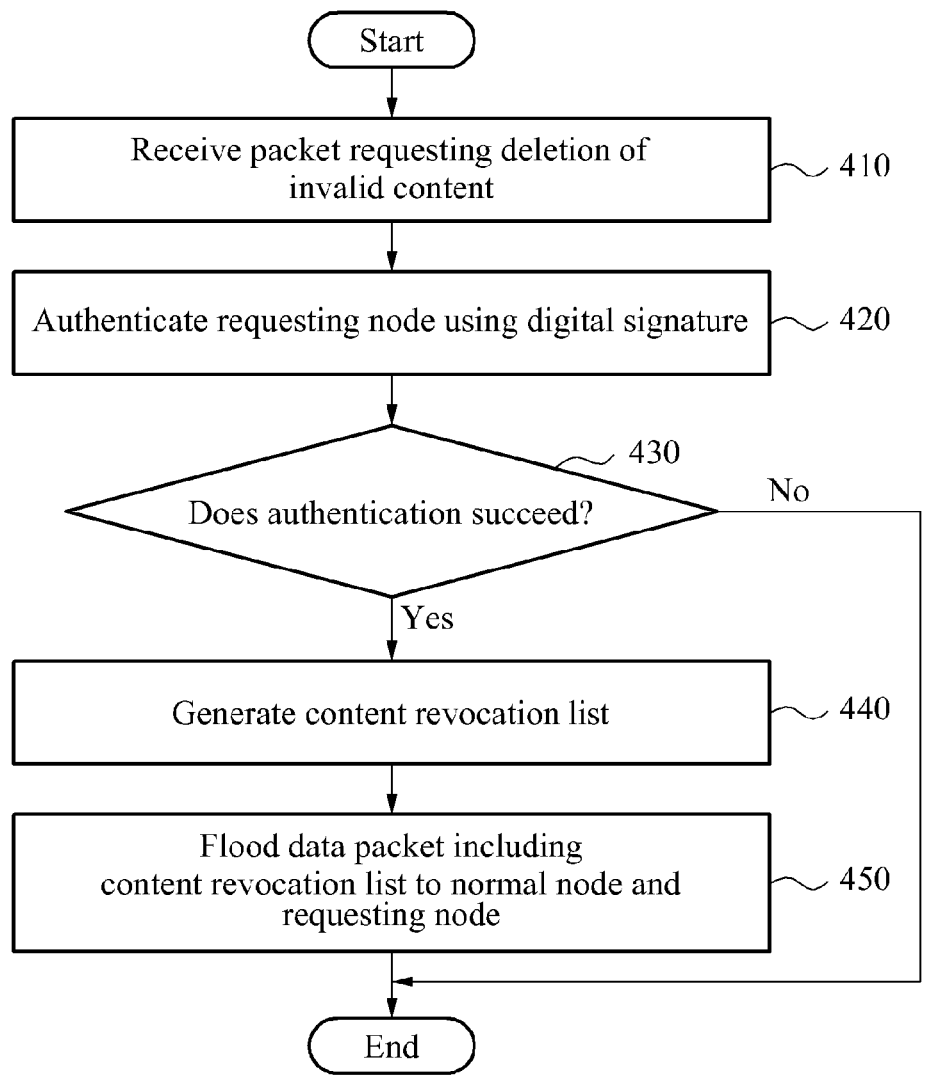
FIG. 4 illustrates a communication method for an administration node in a CCN according to an embodiment.

FIG. 4 illustrates a communication method for an administration node in a CCN according to an embodiment.

Referring to FIG. 4, in 410, the method receives a packet requesting deletion of invalid content. For example, the administration node according to an embodiment receives a deletion request packet from a requesting node when the requesting node detects invalid content.

The invalid content corresponds to content to be deleted or abnormal content. The invalid content include, for example, at least one of content for which a service is discontinued by a publisher, content flooded to network nodes but required for modification or an update due to version up or other reasons, a malicious content infected with a virus and the like. However, these are only examples of invalid content, and many other types of invalid content exist that may need to be deleted. Invalid content includes content where storing the content presents a danger, such as a security danger, and/or content that is obsolete or otherwise no longer needed.

For example, the deletion request packet includes at least one of a name of invalid content, an identification (ID) for identifying a control operation to be performed on the invalid content, for example, an operation ID (OID), additional information associated with the control operation, and a digital signature of a requesting node. These pieces of information are useful because they define parameters of how the deletion is to be performed or otherwise facilitate the performance of the deletion.

In 420, the method authenticates the requesting node using a digital signature. For example, the administration node authenticates the requesting node through the digital signature included in the deletion request packet received in 410.

In 430, the method determines whether the authentication succeeds. For example, the administration node determines whether the authentication succeeds. In this example, when the authentication fails, the administration node terminates the process.

In 440, the method generates a content revocation list. For example, when the authentication succeeds in 430, the administration node generates a content revocation list. In this example, the content revocation list describes a name of invalid content and a predetermined period of time over which deletion is to be performed.

In 450, the method floods a data packet including a content revocation list to a normal node and the requesting node. For example, the administration node floods a data packet including the content revocation list to the requesting node and a normal node included in the CCN.

For example, the data packet includes a content revocation list. Optionally, the data packet further includes a name of the content revocation list, an ID for identifying a control operation to be performed on invalid content, additional information associated with the control operation, and a digital signature of an administration node. As discussed above, these pieces of information are useful because they define parameters of how the deletion is to be performed or otherwise facilitate the performance of the deletion.

According to an embodiment, the administration node corresponds to a node having authority over control functions associated with content deletion, rather than managing an entire network domain. Accordingly, at least one network node serve as an administration node without requiring the need for separate equipment such as, for example, a central server.

In a case where a publisher is given authority to manage its content, the publisher generates and transmits a content revocation list to cause contents of the publisher to be deleted.

However, in order to preserve the integrity of data in the network, some embodiments provide security features. In an example, the administration node is authorized to generate a name of a content revocation list and to create a digital signature in a data packet including the content revocation list, and contains a security key. In this case, a method of assigning authority to the administration node uses one of a variety of relevant methods of assigning authority to a network node. Such methods of assigning authority use a variety of approaches to ensure security.

This embodiment shows that only one administration node generates and floods a content revocation list. However, in other embodiments, a plurality of administration nodes are present in the network, and the plurality of administration nodes generate a plurality of content revocation lists. In order to distinguish between the plurality of content revocation lists, the lists are provided with differing names. In this case, the administration nodes generate names for the content revocation list using various methods. As noted above, a requirement for generating the names for the content revocation lists is that the names must be unique to ensure that it is possible to distinguish between content revocation lists.

Figure 5:
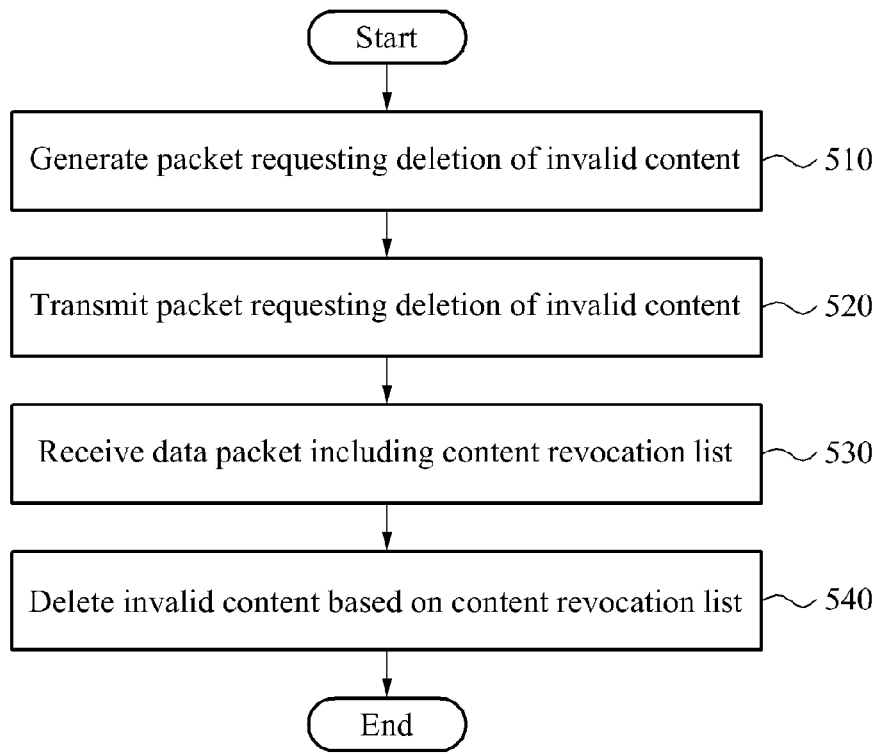
FIG. 5 illustrates a communication method for a requesting node in a CCN according to an embodiment.

FIG. 5 illustrates a communication method for a requesting node in a CCN according to an embodiment.

Referring to FIG. 5, in 510, the method generates a packet requesting the deletion of invalid content. For example, the requesting node according to an embodiment generates a deletion request packet when the requesting node detects invalid content.

In 520, the method transmits a packet requesting the deletion of invalid content. For example, the requesting node transmits the deletion request packet to an administration node.

In one example, the request for the invalid content to be deleted is made by all nodes in the network. However, to prevent random deletion, another example allows only a reliable requesting node having a trust relationship with an administration node to generate and transmit a deletion request packet.

For example, when the deletion request packet is transmitted from a node included in a network domain, the administration node potentially receives the deletion request packet, and otherwise, discards the deletion request packet.

In an example, the trust relationship between the administration node and the requesting node is formed using a general trust model.

In 530, the method receives a data packet including a content revocation list. For example, the requesting node receives a data packet including the content revocation list from the administration node in response to the transmission performed in 520.

In an example, the content revocation list includes a name of invalid content and a period of time over which deletion is to be performed. As noted above, each content is uniquely named and hence a name of invalid content is sufficient to identify and retrieve the content. Also, the data packet potentially includes the content revocation list. The data packet optionally further includes one or more of a name of the content revocation list, an ID for identifying a control operation to be performed on the invalid content, additional information associated with the control operation, and a digital signature of an administration node. Additionally, the data packet potentially includes other types of information that are of use in the content revocation process.

When the requesting node receives the data packet, in an example the requesting node certifies that the data packet is generated by the administration node. For example, the certification is performed by processing a digital signature included in the data packet. Such certification is successful in response to the digital signature being valid. When the certification succeeds, the requesting node receives the data packet, or deletes the invalid content based on the content revocation list.

In 540, the method deletes invalid content based on the content revocation list. For example, the requesting node deletes the invalid content based on the content revocation list.

In this example, the requesting node determines whether an ID for identifying a control operation included in the data packet indicates a content deletion operation to be performed on invalid content. In response to the ID for identifying the control operation being determined to indicate a content deletion operation to be performed on invalid content, the requesting node subsequently deletes the invalid content based on the content revocation list.

Figure 6:
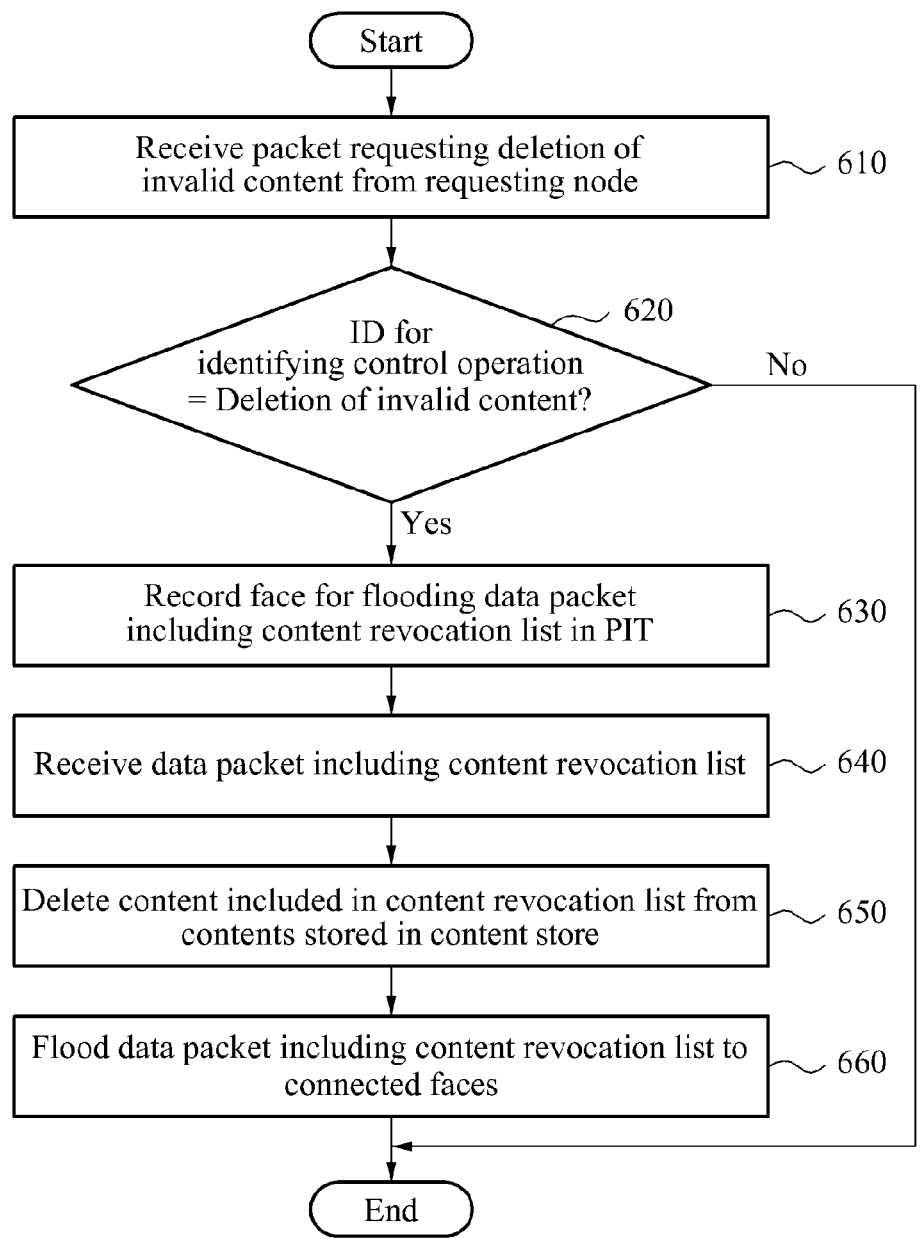
FIG. 6 illustrates a communication method for a normal node in a CCN according to an embodiment.

FIG. 6 illustrates a communication method for a normal node in a CCN according to an embodiment.

Referring to FIG. 6, in 610, the method receives a packet requesting deletion of invalid content from a requesting node. For example, the normal node according to an embodiment receives a packet requesting deletion of invalid content, from a requesting node. Such a packet requesting deletion of invalid content is a deletion request packet. In an example, the deletion request packet includes one more of a name of invalid content, an ID for identifying a control operation to be performed on the invalid content, additional information associated with the control operation, and a digital signature of a requesting node.

In 620, the method determines whether an ID for identifying a control operation corresponds to an ID for deletion of invalid content. For example, the normal node determines whether an ID for identifying a control operation included in the deletion request packet indicates a content deletion operation to be performed on invalid content.

In response to the ID for identifying the control operation being determined not to indicate a content deletion operation to be performed on invalid content in 620, the normal node terminates the process. If the control operation does not indicate a content deletion operation, the remainder of the process is irrelevant, and so the process is finished.

In contrast, when the ID for identifying the control operation is determined to indicate a content deletion operation to be performed on invalid content in 620, in 630 the method records a face for flooding a data packet including the content revocation list in a pending interest table (PIT) of the normal node. For example, the normal node records a face for flooding a data packet including the content revocation list in a pending interest table (PIT) of the normal node in 630.

Also, the normal node records at least one of all faces including a face through which the deletion request packet is received, at least a portion of faces connected to the normal node, and a remaining face other than a particular face to which the packet is forwarded.

In an example, a face 0, a face 1, a face 2, and a face 3 are connected to a normal node. In this example, the face 0 corresponds to a node through which a deletion request packet is received. The face 2 corresponds to a node to which the packet requesting deletion is to be forwarded. Additionally, the face 1 and the face 3 correspond to the remaining faces connected to the normal node. In this example, the normal node records, in a PIT of the normal node, the face 0 through which the deletion request packet is received and all the remaining nodes other than the face 2 to which the packet requesting deletion is to be forwarded. In this example, the remaining nodes are the faces 1 and 3. Here, the normal node records the faces 0, 1, and 3 in the PIT of the normal node.

In 640, the method receives a data packet including a content revocation list. For example, the normal node receives a data packet including the content revocation list flooded by an administration node or a requesting node. In an example, the content revocation list includes a name of invalid content and a period of time over which deletion is to be performed. The data packet potentially includes a content revocation list, and optionally further includes at least one of a name of the content revocation list, an ID for identifying a control operation to be performed on the invalid content, additional information associated with the control operation, and a digital signature of an administration node.

When the normal node receives the data packet or control packet, including the content revocation list, in an example the normal node verifies the digital signature in the corresponding packet. Also, in an example the normal node executes processing according to the content of the data packet or the control packet based on a result of the verification.

When the ID for identifying the control operation included in the data packet is determined to indicate a content deletion operation to be performed on invalid content in 640, in an example the normal node receives the data packet including the content revocation list. In this example, the reception of the data packet is performed irrespective of whether an entry for the data packet is present in the PIT of the normal node. However, in other examples whether the data packet is present in the PIT of the normal node plays a role in how the data packet is managed.

In 650, the method deletes content included in the content revocation list form contents stored in the content store. For example, the normal node deletes content corresponding to a name included in the content revocation list from contents stored in a content store.

In 660, the method floods the data packet including the content revocation list to the connected faces. For example, the normal node transmits or floods the data packet including the content revocation list via faces connected to the normal node.

The normal node maintains the content revocation list during a period of time over which the deletion is to be performed. In an example, this timing information is included in the content revocation list.

Figure 7:
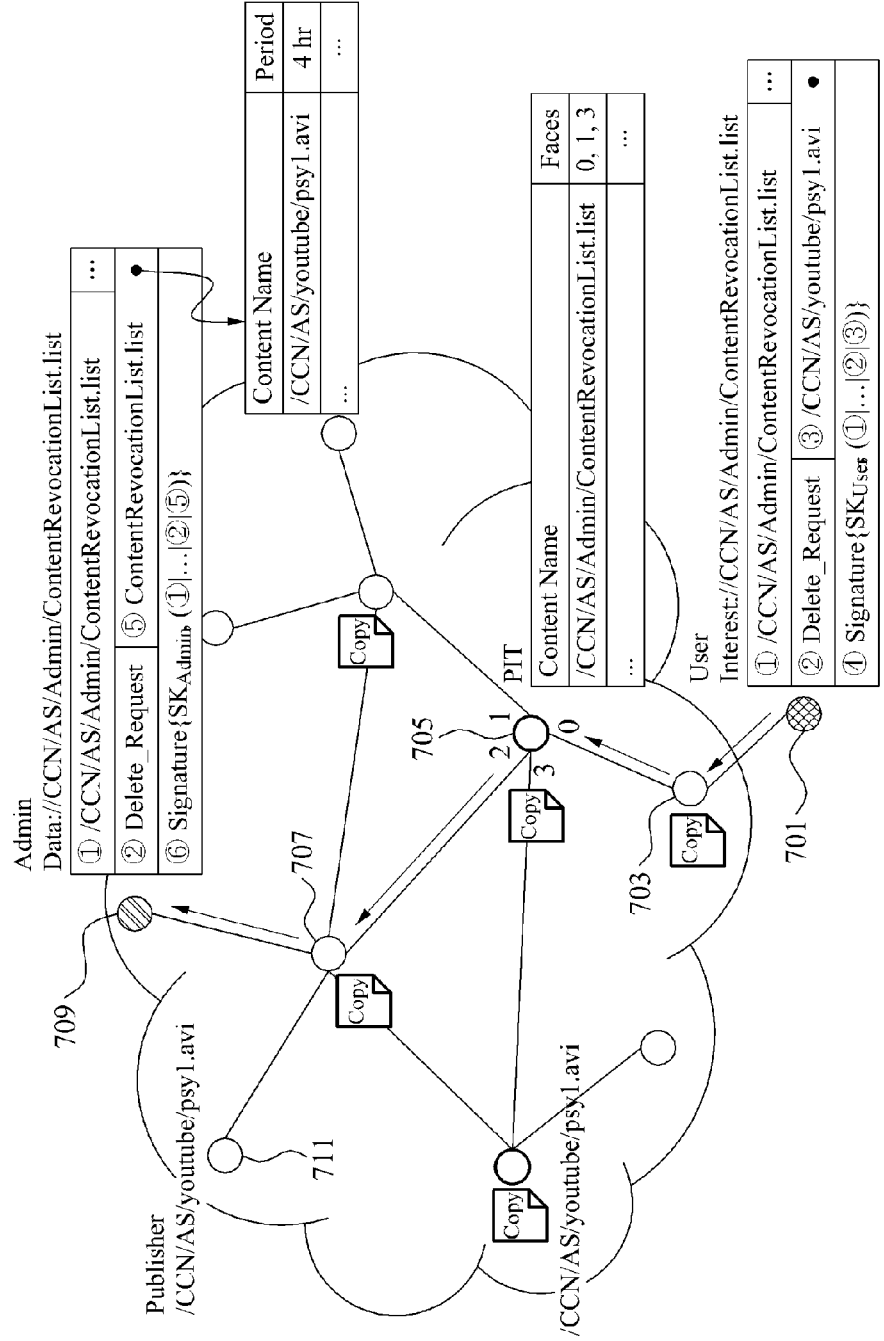
FIG. 7 illustrates a method of requesting deletion of invalid content from a requesting node in a CCN according to an embodiment.

FIG. 7 illustrates a method of requesting deletion of invalid content from a requesting node in a CCN according to an embodiment.

Referring to FIG. 7, when a requesting node 701 detects invalid content in the CCN according to an embodiment, the requesting node 701 transmits a packet requesting deletion of the invalid content, namely, a deletion request packet. The packet is transmitted to an administration node 709, such as through normal nodes 703, 705, and 707 on a network path.

For this, the requesting node 701 generates the deletion request packet when the requesting node 701 detects the invalid content.

A deletion request packet, as discussed above, provides information about which content is to be deleted from the CCN. For example, a deletion request packet may be: "Interest://CCN/AS/Admin/ContentRevocationList.list", generated by the requesting node 701.

Such a deletion request packet is labeled as an "Interest". The packet includes at least one of ① a name of a content revocation list, which in the example is "CCN/AS/Admin/ContentRevocationList.list", ② an ID for identifying a control operation to be performed on the invalid content, "Delete_Request", ③ additional information associated with the control operation, "CCN/AS/youtube/psy1.avi", and ④ a digital signature of the requesting node 701, "Signature{SK user, (① | . . . |② ③ )}". These elements that are found in a packet have been discussed above, and assist in the deletion request process.

Through the deletion request packet, the requesting node 701 informs the administration node 709 that a content deletion operation is requested to be performed, and enables transmission of the content revocation list over a transmission path of the deletion request packet.

The content revocation list is not necessarily transmitted over the transmission path of the deletion request packet. However, according to characteristics of a CCN in which a data packet is transmitted in response to an interest after the interest occurs, the deletion request packet is transmitted in a type of an interest, in an embodiment.

In an example, the deletion request packet is transmitted to the administration node 709 through the normal nodes 703, 705, and 707. Additionally, the network includes a publisher node 711 that is not part of the path.

In an embodiment, the deletion request packet specifies an objective of the packet in a header explicitly by defining an operation ID (OID) for content control as shown in ②.

In a case in which the operation ID indicates the objective of the packet, the packet may include additional information. For example, in a case in which the operation ID indicates a control command for content deletion to be performed, information associated with content to be controlled is described in additional information in detail.

In an embodiment, to indicate content to be deleted, an additional information field is provided in a header of the packet, as shown in ③.

A digital signature, for example, the digital signature shown in ④, is added to the deletion request packet in an embodiment to certify that the deletion request packet is transmitted from a reliable network node and to verify that the deletion request packet representing significant information. Such verification helps ensure, for example, that the content to be deleted is not counterfeited, because the objective of the deletion request packet is to request content to be deleted and a request to delete counterfeit data could jeopardize the integrity of the data in the CCN.

In FIG. 7, when the normal node 705 receives the deletion request packet from the requesting node 701, the normal node 705 records, in a PIT of the normal node 705, all the remaining faces connected to the normal node 705 other than a face to which the deletion request packet is to be forwarded. The normal node 705 also records a face through which the deletion request packet is received. Accordingly, when a data packet including the content revocation list is received thereafter, the normal node 705, in an example, floods the corresponding data packet to neighboring nodes, thereby achieving efficient content deletion throughout the entire network because the flooding process helps ensure that the data packet is propagated throughout the CCN so as to perform efficient content deletion.

After the administration node 709 receives the deletion request packet through the normal nodes 703, 705, and 707, the administration node 709, in the example of FIG. 7, generate a data packet including the content revocation list. Also, the administration node 709 floods the network including the requesting node 701 and the normal nodes 703, 705, and 707 with the generated data packet.

The generated data packet includes elements such as ① a name of the content revocation list, for example, "CCN/AS/Admin/ContentRevocationList.list", ② an ID for identifying a control operation to be performed, for example, deletion, on the invalid content, for example, "OID=Delete Request", ⑤ the content revocation list, and ⑥ a digital signature of the administration node, for example, "Signature[$SK_{Admin}$]".

In an example, the content revocation list ⑤ includes a name of invalid content, for example, "/CCN/AS/youtube/psy1.avi", and a period of time over which deletion is to be performed, for example, four hours. As noted above, content revocation list ⑤ uniquely identifies the content to delete and a timeframe for deleting such content.

Also, in an example, information associated with a method of recording a face for flooding a data packet is recorded in an additional information field. In this example, additional information is described for a normal node receiving a data packet to record, in a PIT of the normal node, at least one of all faces including a face through which a deletion request packet is received, at least a portion of faces connected to the normal node, and a remaining face other than a particular face to which the data packet is forwarded.

Figure 8:
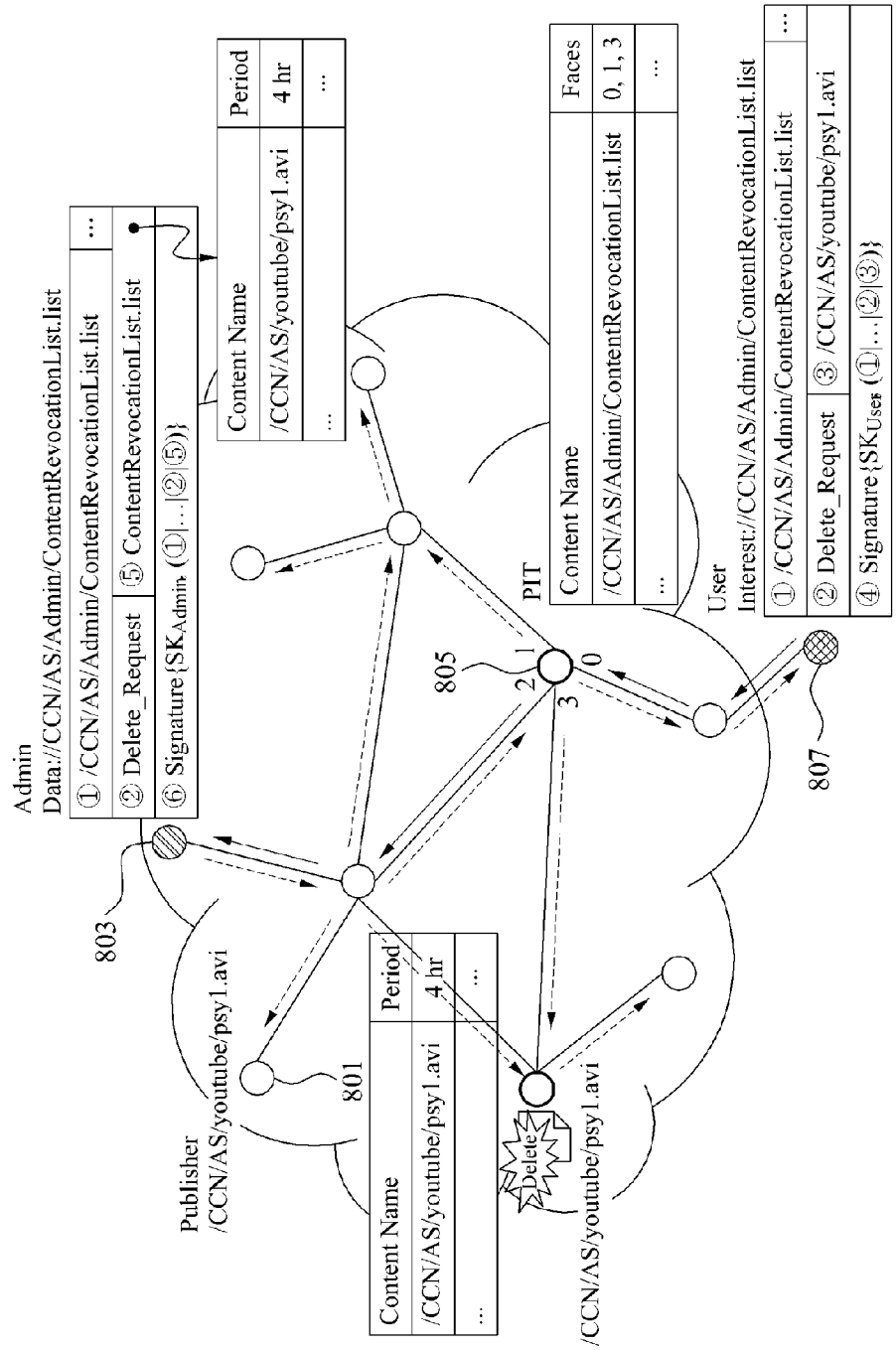
FIG. 8 illustrates a method of flooding a content revocation list and deleting content using the content revocation list in a CCN according to an embodiment.

FIG. 8 illustrates a method of flooding a content revocation list and deleting content using the content revocation list in a CCN according to an embodiment.

Referring to FIG. 8, gradual deletion of invalid content is implemented by flooding a data packet, including a content revocation list, to each node in the CCN, according to an embodiment, so that nodes in which invalid content is cached may delete the invalid content.

An administration node 803 determines whether content deletion is needed by identifying and analyzing a digital signature included in a content deletion packet, and also generates a content revocation list.

In an example, the content revocation list corresponds to a CCN content, and may describe a name of content to be deleted and a period of time over which deletion is to be performed, as discussed above. Also, the content revocation list may include version information. When a new content revocation list is generated and flooded, network nodes identify an up-to-date content revocation list using the version information to determine which content revocation list is most up-to-date.

The administration node 803 transmits a data packet including the content revocation list to a requesting node 807 along a transmission path of the deletion request packet, namely, a face.

In the process of transmitting the data packet to the requesting node 807, in an example a normal node 805 on the transmission path transmits the data packet to neighboring nodes so that the network is flooded with the content revocation list. By flooding the network with the content revocation list, the network is efficiently and thoroughly processed to delete the content form the network in keeping with the parameters included in the data packet.

In the example of FIG. 8, nodes in the network receiving the data packet flooded by the administration node 803 delete content corresponding to a name "/CCN/AS/youtube/psy1.avi" included in the content revocation list "/CCN/AS/Admin/ContentRevocationList.list" from content stores of the nodes. As discussed above, if the content is included in the content revocation list, there is a reason to remove that content from the nodes and hence such content is deleted.

Also, optionally, the nodes receiving the data packet including the content revocation list may maintain the content revocation list during the period of time over which deletion is to be performed, for example, four hours. Such a time period provides the ability to control the deletion process so that the deletion is performed when appropriate, but it is not appropriate to continue the deletion indefinitely.

In this example, the nodes receiving the data packet including the content revocation list identify an operation ID in a header of the data packet, and even though the data packet is absent in PITs of the nodes, receive the data packet in a case in which the data packet includes the content revocation list.

Subsequently, the nodes receiving the data packet identify a digital signature to verify whether the data packet is generated by the administration node 803, search content stores for content corresponding to a name described in the content revocation list, and delete the corresponding content.

In a case in which the content corresponding to the name included in the deleted content is received, the nodes receiving the data packet delete the corresponding content, absent caching, when the corresponding content is received within the period of time over which deletion is to be performed, as described in the content revocation list.

When a node is powered off, although included in the network, the node may fail to receive the content revocation list or the updated content revocation list that is newer than a previous version, when flooded by the administration node 803. Hence, an embodiment that encounters this problem may include functionality to overcome the problem.

Thus, to address this problem, when the node is powered on and starts to work in the network, the node requests, from the administration node 803, the content revocation list or the updated content revocation list flooded by the administration node 803 that was disseminated while the node was powered off, and receives the content revocation list in response to the request. Hence, even if nodes are inactive when content revocation lists are distributed, the nodes are configured to ensure that they are participating in the content revocation process as soon as they are powered on.

Similar to the nodes described in the foregoing that were previously powered on, when the node is powered on and starts to work, the node deletes content using the received content revocation list or floods the received content revocation list. Hence, when the node is powered on, it acts as if it were powered on when the original content revocation list is distributed.

Also, as shown in FIG. 8, a publisher 801 deletes the corresponding content when the publisher 801 receives the data packet including the content revocation list.

A variety of circumstances qualify content for deletion. For example, when contents cached in the network nodes are found to be malicious content, for example, malware or viruses, the content is deleted. Alternatively, if the content is content that a publisher is unwilling to flood, for example, content for which service is discontinued by a publisher, deletion of the corresponding content is also performed.

However, in the CCN, recognizing all network nodes in which particular content that needs to be deleted is cached is potentially difficult.

Furthermore, even though a content deletion command is transmitted to all network nodes in which particular content is cached, a network node may fail to receive the content deletion command. In this case, transmission of content to be deleted sometimes still occurs, and the corresponding content is cached again and still exists on the network.

Such a scenario is subject to abuse by a network attacker. For example, when a network attacker continues to request particular content, the corresponding content may be cached in network nodes for a long period of time. As a result, significant contents are cached in each network node for a relatively short period of time, or may not be even cached due to competition for cache space from less important content due to the activity of the attacker.

Accordingly, to prevent network efficiency reduction and to reduce malicious content risks, deletion of invalid content is performed gradually in embodiments by flooding the network with a content revocation list including a name of invalid content and a period of time over which deletion is to be performed.

Figure 9:
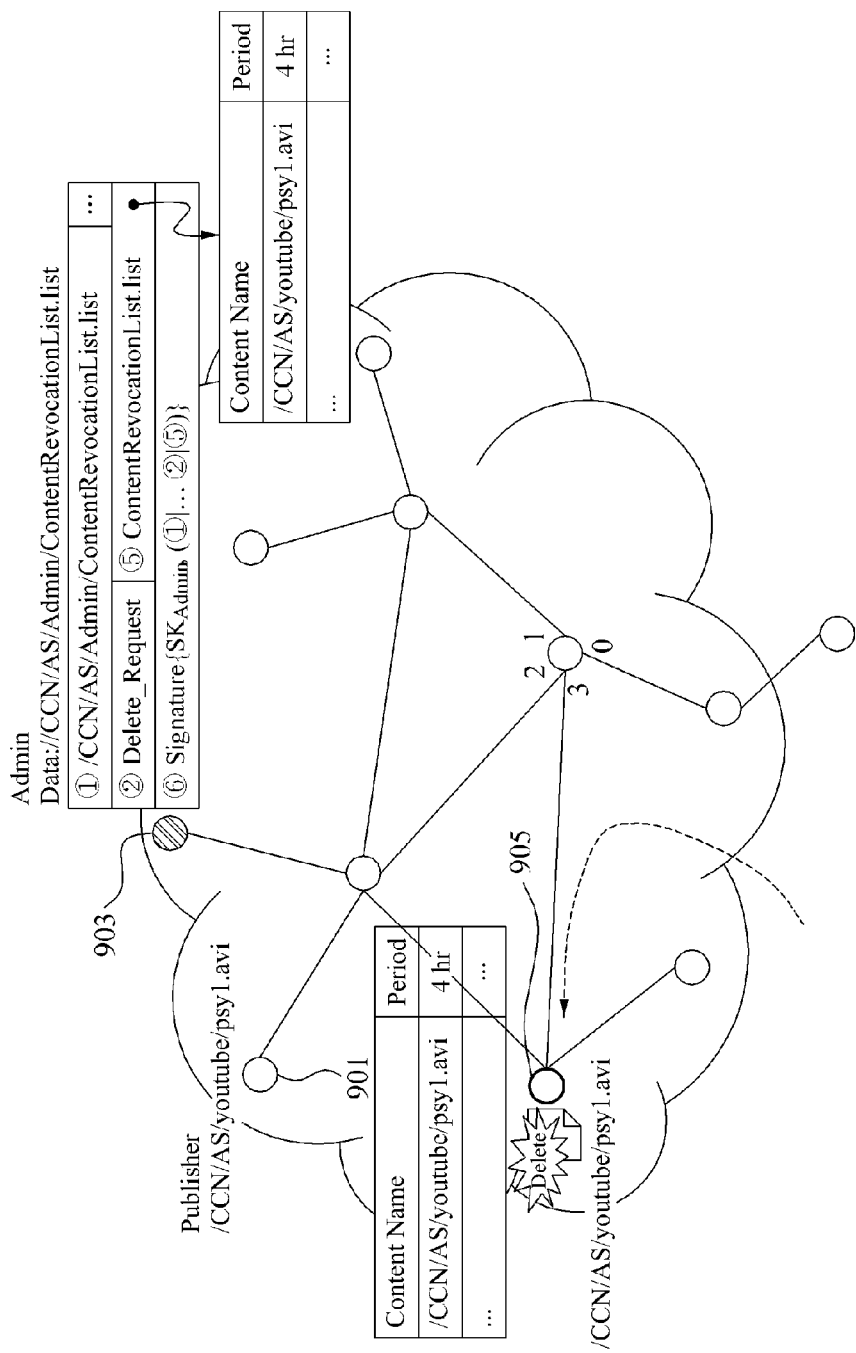
FIG. 9 illustrates a method of deleting content included in a content revocation list, based on a period of time over which deletion is to be performed in a network node in a CCN according to an embodiment.

FIG. 9 illustrates a method of deleting content based on a period of time over which deletion is to be performed, included in a content revocation list, in a network node in a CCN according to an embodiment.

Referring to FIG. 9, after the invalid content is deleted by a node 905, when content corresponding to a name of the deleted invalid content is received, operation of the node 905 is illustrated.

In this example, the node 905 receives a data packet including a content revocation list flooded by an administration node 903, and deletes invalid content, for example, "/CCN/AS/youtube/psy1.avi", based on an ID for identifying a control operation included in the data packet.

After the node 905 deletes the invalid content "/CCN/AS/youtube/psy1.avi", when the node 905 receives content corresponding to the name of the invalid content "/CCN/AS/youtube/psy1.avi" within the period of time over which deletion is to be performed, for example, four hours, the node 905 deletes the corresponding content, without caching it, based on the content revocation list still being maintained in the node 905.

Also, after a publisher 901 deletes invalid content, when content corresponding to the name of the invalid content is received, the publisher 901 deletes the corresponding content using a content revocation list that is still maintained in the publisher 901.

Figure 10:
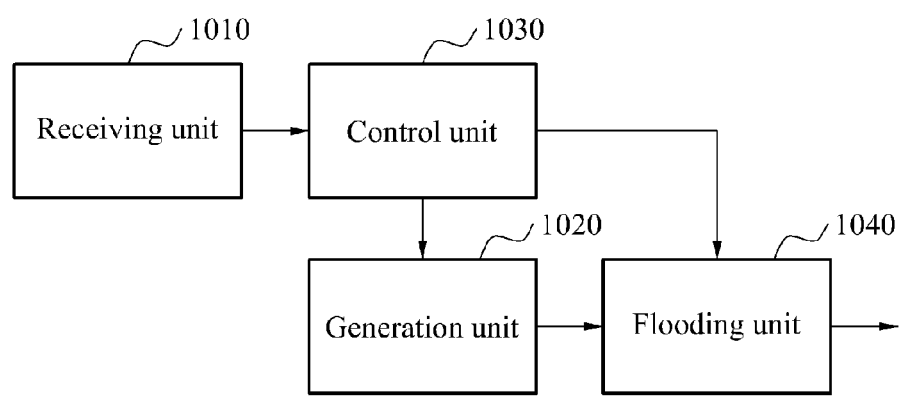
FIG. 10 illustrates an administration node in a CCN according to an embodiment.

FIG. 10 illustrates an administration node in a CCN according to an embodiment.

Referring to FIG. 10, the administration node includes a receiving unit 1010, a generation unit 1020, a control unit 1030, and a flooding unit 1040. However, the administration node may include other elements in addition to or in lieu of these elements. In this example, the administration node is authorized to generate a name of a content revocation list and to create a digital signature in a data packet including the content revocation list, and the administration node contains a security key.

The receiving unit 1010 is configured to receive a packet requesting deletion of invalid content, namely, a deletion request packet, from a requesting node detecting the invalid content. The invalid content may be called abnormal content or content to be deleted, as has been discussed above.

The deletion request packet includes at least one of a name of invalid content, an ID for identifying a control operation to be performed on the invalid content, for example, an operation ID (OID), additional information associated with the control operation, and a digital signature of a requesting node. In an example, the additional information includes information associated with content requested to be deleted and version information of the content requested to be deleted.

The generation unit 1020 is configured to generate a content revocation list including a name of invalid content and a period of time over which deletion is to be performed, in response to the deletion request packet being received by the receiving unit 1010.

The flooding unit 1040 is configured to flood a data packet including the content revocation list to the requesting node and a normal node included in the CCN.

In an example, the data packet further includes at least one of a name of the content revocation list, an ID for identifying a control operation to be performed on the invalid content, additional information associated with the control operation, and a digital signature of the administration node.

The control unit 1030 is configured to authenticate the requesting node through the digital signature included in the deletion request packet received by the receiving unit 1010. When the authentication executed by the control unit 1030 using the digital signature succeeds, the generating unit 1020 generates the content revocation list.

Figure 11:
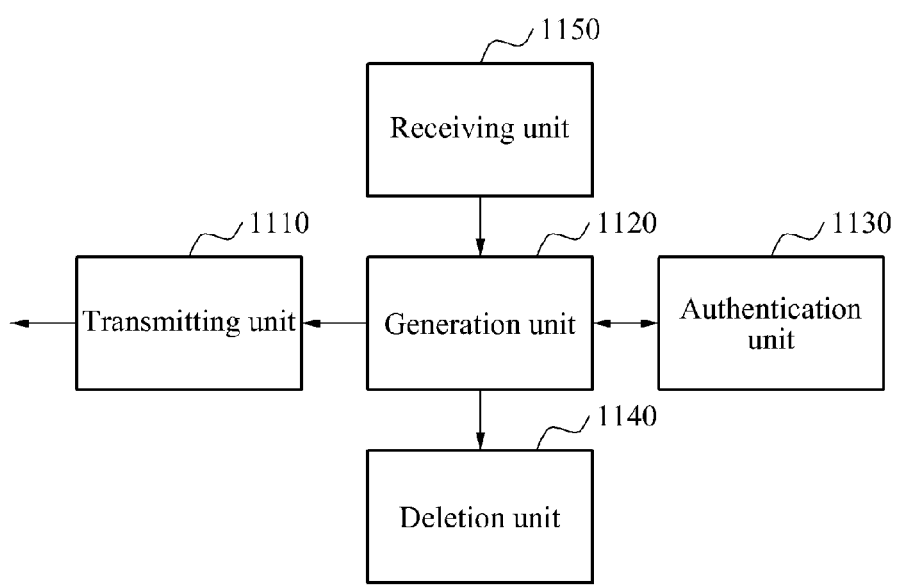
FIG. 11 illustrates a requesting node in a CCN according to an embodiment.

FIG. 11 illustrates a requesting node in a CCN according to an embodiment.

Referring to the example of FIG. 11, the requesting node includes a transmitting unit 1110, a generation unit 1120, an authorization unit 1130, a deletion unit 1140, and a receiving unit 1150. However, the requesting node may include other elements in addition to or in lieu of these elements.

The transmitting unit 1110 transmits a packet requesting deletion of invalid content to be deleted, namely, a deletion request packet, to an administration node.

The generation unit 1120 generates the deletion request packet when invalid content is detected.

The receiving unit 1150 receives a data packet including the content revocation list from the administration node in response to the transmission by the transmitting unit 1110.

The data packet optionally further includes at least one of a name of the content revocation list, an ID for identifying a control operation to be performed on the invalid content, additional information associated with the control operation, and a digital signature of the administration node.

The deletion unit 1140 deletes the invalid content based on the content revocation list included in the data packet received by the receiving unit 1150. As discussed above, the content revocation list includes a name of the invalid content and a period of time over which the deletion is to be performed.

In an embodiment, the authorization unit 1130 certifies that the data packet is generated by a verified administration node through the digital signature included in the data packet. However, a digital signature is only one way of verifying the data packet's origin, and other embodiments use different ways of verifying the data packet's origin.

Figure 12:
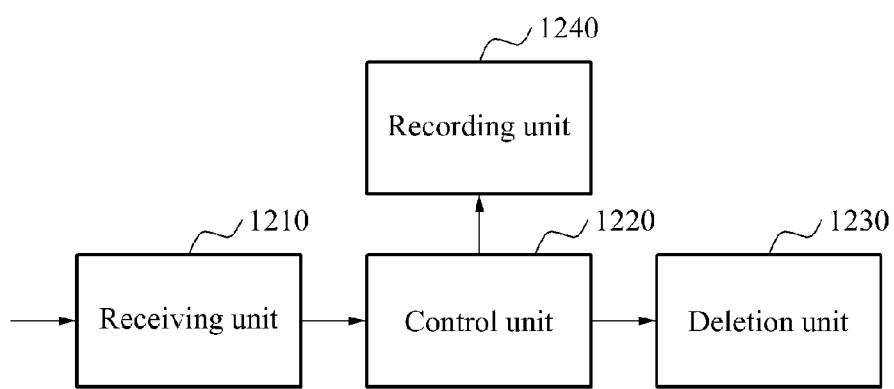
FIG. 12 illustrates a normal node in a CCN according to an embodiment.

FIG. 12 illustrates a normal node in a CCN according to an embodiment.

Referring to the example of FIG. 12, the normal node includes a receiving unit 1210, a control unit 1220, a deletion unit 1230, and a recording unit 1240. However, the normal node may include other elements in addition to or in lieu of these elements.

The receiving unit 1210 receives a data packet including a content revocation list from an administration node or a requesting node. The content revocation list includes a name of invalid content and a period of time over which deletion is to be performed.

When an ID for identifying a control operation indicates a content deletion operation is to be performed on invalid content, the receiving unit 1210 receives the data packet including the content revocation list. In an embodiment, the receiving unit receives the data packet including the content revocation list irrespective of whether an entry for the data packet is present in a PIT.

The data packet optionally further include at least one of a name of the content revocation list, an ID for identifying a control operation to be performed on the invalid content, additional information associated with the control operation, and a digital signature of the administration node.

The receiving unit 1210 receives a deletion request packet from the requesting node. For example, the deletion request packet includes at least one of a name of the invalid content, an ID for identifying a control operation to be performed on the invalid content, for example, an operation ID (OID), additional information associated with the control operation, and a digital signature of the requesting node.

The deletion unit 1230 deletes content corresponding to a name included in the content revocation list from contents stored in a content store of the normal node.

The control unit 1220 maintains the content revocation list during the period of time over which deletion is to be performed.

In a scenario in which the receiving unit 1210 receives content corresponding to the name of the deleted content after the content corresponding to the name included in the content revocation list is deleted, the control unit 1220 controls the deletion unit 1230 to delete the corresponding content without caching when the corresponding content is received within the period of time over which deletion is to be performed.

When an ID for identifying a control operation included in the deletion request packet indicates a content deletion operation to be performed on the invalid content, the control unit 1220 controls the recording unit 1240 so that it records a face for flooding the data packet, including the content revocation list, in the PIT.

According to embodiments presented herein, a reduction in network efficiency may be prevented and malicious content risks may be reduced, by gradual deletion of invalid contents cached in network nodes.

Additionally, according to an embodiment, a publisher may protect information properties of the publisher by direct control of a period of time over which contents of the publisher are to be published or flooded.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A communication method performed by an administration node in a content centric network (CNN), comprising:
   receiving a packet requesting deletion of an invalid content from a requesting node that detects the invalid content;
   generating, in response to the packet requesting deletion of invalid content being received, a content revocation list comprising a name of the invalid content and a period of time over which the deletion request is to be performed, the period of time over which the deletion request is to be performed having a start time and an end time;
   transmitting a data packet comprising the content revocation list to the requesting node and a normal node in the CNN
   maintaining the content revocation list from the start time of the period of time over which the deletion request is to be performed to the end of the period of time over which the deletion request is to be performed and
   deleting the invalid content based on the content revocation list from the contents stored in a content store.

2. The communication method of claim 1, further comprising: authenticating the requesting node by using a digital signature in the packet requesting deletion of the invalid content.

3. The communication method of claim 2, wherein the generating of the content revocation list further comprises generating the content revocation list in response to the authentication of the requesting node using the digital signature being successful.

4. The communication method of claim 1, wherein the packet requesting deletion of the invalid content comprises at least one of a name of the invalid content, an identification (ID) for identifying a control operation to be performed on the invalid content, additional information associated with the control operation, and a digital signature of the requesting node.

5. The communication method of claim 1, wherein the data packet further comprises at least one of a name of the content revocation list, an identification (ID) for identifying a control operation to be performed on the invalid content, additional information associated with the control operation, and a digital signature of the administration node.

6. The communication method of claim 1, wherein the administration node is authorized to generate a name of the content revocation list and to create a digital signature in the data packet comprising the content revocation list, and contains a security key.

7. The communication method of claim 1, wherein the invalid content comprises at least one of a content for which a service is discontinued by a publisher, a content required for modification or update, and a malicious content.

8. The communication method of claim 1, wherein the period of time over which the deletion request is to be performed comprises a time the content revocation list is maintained at a node that receives the content revocation list.

9. A communication method performed by a requesting node in a content centric network (CNN), comprising:
   generating a packet requesting deletion of an invalid content in response to the invalid content being detected;
   transmitting the packet requesting deletion of the invalid content to an administration node;
   receiving a data packet comprising a content revocation list from the administration node, in response to the transmission;
   deleting the invalid content based on the content revocation list, wherein the content revocation list comprises a name of the invalid content and a period of time over which the deletion request to be performed, the period of time over which the deletion request is to be performed having a start time and an end time and
   wherein the content revocation list is maintained from the start time of the period of time over which the deletion request is to be performed to the end time of the period of time over which the deletion request is to be performed, and wherein any instance of the content is deleted between the start time and the end time.

10. The communication method of claim 9, wherein the data packet further comprises at least one of a name of the content revocation list, an identification (ID) for identifying a control operation to be performed on the invalid content, additional information associated with the control operation, and a digital signature of the administration node, and the method further comprises certifying that the data packet is generated by the administration node by using the digital signature in the data packet.

11. The communication method of claim 9, further comprising: transmitting a packet requesting the content revocation list to the administration node; and receiving a data packet comprising the content revocation list, in response to the request.

12. A communication method performed by a normal node in a content centric network (CNN), comprising:

receiving a data packet comprising a content revocation list in response to invalid content being detected;

deleting a content corresponding to a name in the content revocation list from contents stored in a content store, wherein the content revocation list comprises a name of an invalid content and a period of time over which the deletion request is to be performed, the period of time over which the deletion request is to be performed having a start time and an end time and maintaining the content revocation list from the start time of the period of time over which the deletion request is to be performed to the end time of the period of time over which the deletion request is to be performed.

13. The communication method of claim 12, wherein the data packet further comprises at least one of a name of the content revocation list, an identification (ID) for identifying a control operation to be performed on the invalid content, additional information associated with the control operation, and a digital signature of an administration node, and the receiving of the data packet comprises receiving the data packet comprising the content revocation list irrespective of whether an entry for the data packet is present in a pending interest table (PIT) in response to the ID for identifying the control operation indicating that a content deletion operation is to be performed on the invalid content.

14. The communication method of claim 12, further comprising: in response to a case in which after the content is deleted, a content corresponding to a name of the deleted content being received, deleting the received content without caching when the content having the name of the deleted content is received within the period of time over which the deletion request is to be performed.

15. The communication method of claim 12, further comprising: receiving a packet requesting deletion of the invalid content from a requesting node.

16. The communication method of claim 15, wherein the packet requesting deletion of the invalid content comprises at least one of a name of the invalid content, an ID for identifying a control operation to be performed on the invalid content, additional information associated with the control operation, and a digital signature of the requesting node.

17. The communication method of claim 16, further comprising:

recording a face for flooding the data packet comprising the content revocation list in a pending interest table (PIT) when the ID for identifying the control operation in the packet requesting deletion of the invalid content indicates a content deletion operation to be performed on the invalid content.

18. The communication method of claim 17, wherein the recording of the face for flooding the data packet comprises recording, in the PIT, at least one of all faces comprising a face through which the packet requesting deletion of the invalid content is received, at least one of faces connected to the normal node, and a remaining face other than a particular face to which the data packet is forwarded.

19. The communication method of claim 12, further comprising: transmitting a packet requesting the content revocation list to an administration node; and receiving a data packet comprising the content revocation list, in response to the request.

20. The communication method of claim 12, further comprising:

receiving content at the normal node;

caching the content in response to the received content not corresponding to the name in the content revocation list; and deleting the content in response to the received content corresponding to the name in the content revocation list and the current time being within the period of time over which the deletion request is to be performed.

21. A non-transitory computer-readable storage medium storing a set of computer-executable instructions that, when executed by a processor, perform the communication method performed by an administration node in a content centric network (CCN) as recited in claim 1.

22. An administration node in a content centric network (CCN), comprising:

a receiving unit configured to receive a packet requesting deletion of an invalid content from a requesting node that detects the invalid content;

a generating unit configured to generate, in response to the packet requesting deletion of the invalid content being received, a content revocation list comprising a name of the invalid content and a period of time over which the deletion request is to be performed, the period of time over which the deletion request is to be performed having a start time and an end time a flooding unit configured to transmit a data packet comprising the content revocation list to the requesting node and a normal node in the CCN a control unit configured to maintain the content revocation list from the start time of the period of time over which the deletion request is to be performed to the end time of the period of time over which the deletion request is to be performed and a deletion unit configured to delete the invalid content based on the content revocation list from contents stored in a content store.

23. The administration node of claim 22, further comprising a control unit configured to authenticate the requesting node by using a digital signature in the packet requesting deletion of the invalid content.

24. The administration node of claim 23, wherein the generation unit is further configured to generate the content revocation list in response to the authentication of the requesting node using the digital signature being successful.

25. A requesting node in a content centric network (CNN), comprising:

a generation unit configured to generate a packet requesting deletion of an invalid content in response to the invalid content being detected;
transmitting unit configured to transmit the packet requesting deletion of the invalid content to an administration node;
a receiving unit configured to receive a data packet comprising a content revocation list from the administration node, in response to the transmission; and
a deletion unit configured to delete the invalid content based on the content revocation list,
wherein the content revocation list comprises a name of the invalid content and a period of time over which the deletion request is to be performed, the period of time over which the deletion request is to be performed having a start time and an end time and
a control unit configured to maintain the content revocation list from the start time of the period of time over which the deletion request is to be performed to the end time of the period of time over which the deletion request is to be performed.

26. The requesting node of claim 25, further comprising:
a transmission unit configured to transmit a packet requesting the content revocation list to the administration node; and
a receiving unit configured to receive a data packet comprising the content revocation list, in response to the request.

* * * * *